SYNCHRONIZING AND PHASING SYSTEM FOR TELEVISION RECORDERS

Filed Dec. 1, 1948 7 Sheets-Sheet 1

Inventors
RAYMOND L. GARMAN
JOHN K. McKENDRY
By
[signature]
Attorney

SYNCHRONIZING AND PHASING SYSTEM FOR TELEVISION RECORDERS

Filed Dec. 1, 1948

7 Sheets-Sheet 2

Inventors
RAYMOND L. GARMAN
JOHN K. McKENDRY
By
F. L. Mackey
Attorney

SYNCHRONIZING AND PHASING SYSTEM FOR TELEVISION RECORDERS

Filed Dec. 1, 1948 7 Sheets-Sheet 3

Inventors
RAYMOND L. GARMAN
JOHN K. McKENDRY
By
[signature]
Attorney

SYNCHRONIZING AND PHASING SYSTEM FOR TELEVISION RECORDERS

Filed Dec. 1, 1948

Inventors
RAYMOND L. GARMAN
JOHN K. McKENDRY
By
H. L. Mackey
Attorney

SYNCHRONIZING AND PHASING SYSTEM FOR TELEVISION RECORDERS

Inventor
RAYMOND L. GARMAN
JOHN K. McKENDRY
By H. A. Mackey
Attorney

SYNCHRONIZING AND PHASING SYSTEM FOR TELEVISION RECORDERS

Filed Dec. 1, 1948

Inventors
RAYMOND L. GARMAN
JOHN K. McKENDRY
By [signature]
Attorney

SYNCHRONIZING AND PHASING SYSTEM FOR TELEVISION RECORDERS

Inventors
RAYMOND L. GARMAN
JOHN K. McKENDRY
By H. L. Mackey
Attorney

Patented July 22, 1952 2,604,535

UNITED STATES PATENT OFFICE 2,604,535

SYNCHRONIZING AND PHASING SYSTEM FOR TELEVISION RECORDERS

Raymond L. Garman and John K. McKendry, Pleasantville, N. Y., assignors to General Precision Laboratory Incorporated, a corporation of New York Application December 1, 1948, Serial No. 62,872

16 Claims. (Cl. 178—7.4)

This invention relates to a system for synchronizing and phasing a television recorder to a television receiver.

In recording a television picture by a motion picture camera, a shutter is required between the camera and the television picture screen for two reasons: The illumination must be cut off from the motion picture film during the pulldown of the latter, and the duration of each illumination must be exactly the duration of one television frame. Maintenance of correct time relations is therefore required between the shutter and the television receiver and both synchronism and proper phasing are required between the shutter and the camera pulldown or intermittent mechanism.

In the past it has been attempted to attain the above objects by the use of a mechanical shutter consisting of a perforated revolving disc placed between the television screen and the camera, mechanically connected with the camera intermittent mechanism so that synchronism and proper phase between the two are maintained. The difficulty has been in the maintenance of each period of film illumination for exactly the length of time of reception of one video picture, equal to the time according to present television standards of 525 horizontal scans or lines. Since the length of time required to exhibit 525 lines is controlled at the television transmittter it is not under control of the television receiver operator, and it therefore is necessary to match the illumination time permitted by the disc to the period of one television picture. However, since the disc illumination time at any speed is determined by the size of holes in the disc, any change in their size requires a change in the engineering design of the disc. Such a change is of course not possible during operation for automatic accommodation to momentary changes or slow drifts in the television picture transmission frequency, and so mechanical shuttering has not been completely successful.

Electronic shutters are therefore particularly desirable because difficulties such as described can be overcome. However, in the use of electronic shutters other difficulties have been encountered in synchronizing and phasing the shutter with the camera intermittent and in synchronizing the shutter with the television receiver. Attempts to start or stop the period of illumination at the precise instant of initiation or termination of a television field of 262½ lines have encountered the difficulty of timing with enough precision to measure fractional lines with high accuracy. Such systems, for these and other reasons, have not been successful.

The instant invention overcomes these difficulties. It times an electronic shutter with the television receiver to permit each illumination for exactly one television picture of 525 lines, controlled by the receiver itself and starting with the beginning of the initial line and terminating at the end of the 525th line. The invention also utilizes synchronizing and phasing signals generated by the operation of the shutter and employs them to control the camera, so that all controls arise from one primary source, the television equipment. These controls are positive and automatic, instantly accommodating the operation of the shutter and camera to any changes in operation of the television equipment. Any electronic shutter satisfying these requirements may be employed in the instant invention such as, for example, the shutter comprising a scale-of-128 circuit described in the copending application, Serial No. 62,832, filed December 1, 1948, now Patent No. 2,595,397, granted May 6, 1952, of R. W. Lee et al.

The provision of a method and means for synchronizing and phasing the operation of the camera with the shutter in television recorders is one of the purposes of this invention.

The means of synchronizing the intermittent, when the latter is operated by a motor and a local electric power supply, requires equipment for controlling the speed of the intermittent, and means of phasing requires equiment for controlling its angular displacement. These means must include provision for feeding a signal back from the intermittent containing phase-shift information, and must also include a comparator to compare the feedback signal with the reference signal and thereby generate a correction signal. The comparator may be of any type that furnishes signals in the desired form, two types being described hereinafter as examples.

In introducing synchronzing and phasing correction rotations to the camera intermittent, the point of introduction may be between the camera motor and the intermittent, it may be at the motor itself, or it may be in the electric power conductors serving the motor. The provision of methods and means for introducing phasing and synchronizing corrections to the intermittent at such points is another of the purposes of this invention.

The invention will be more readily understood from the following detailed description, considered together with the attached drawings in which.

Figure 1:
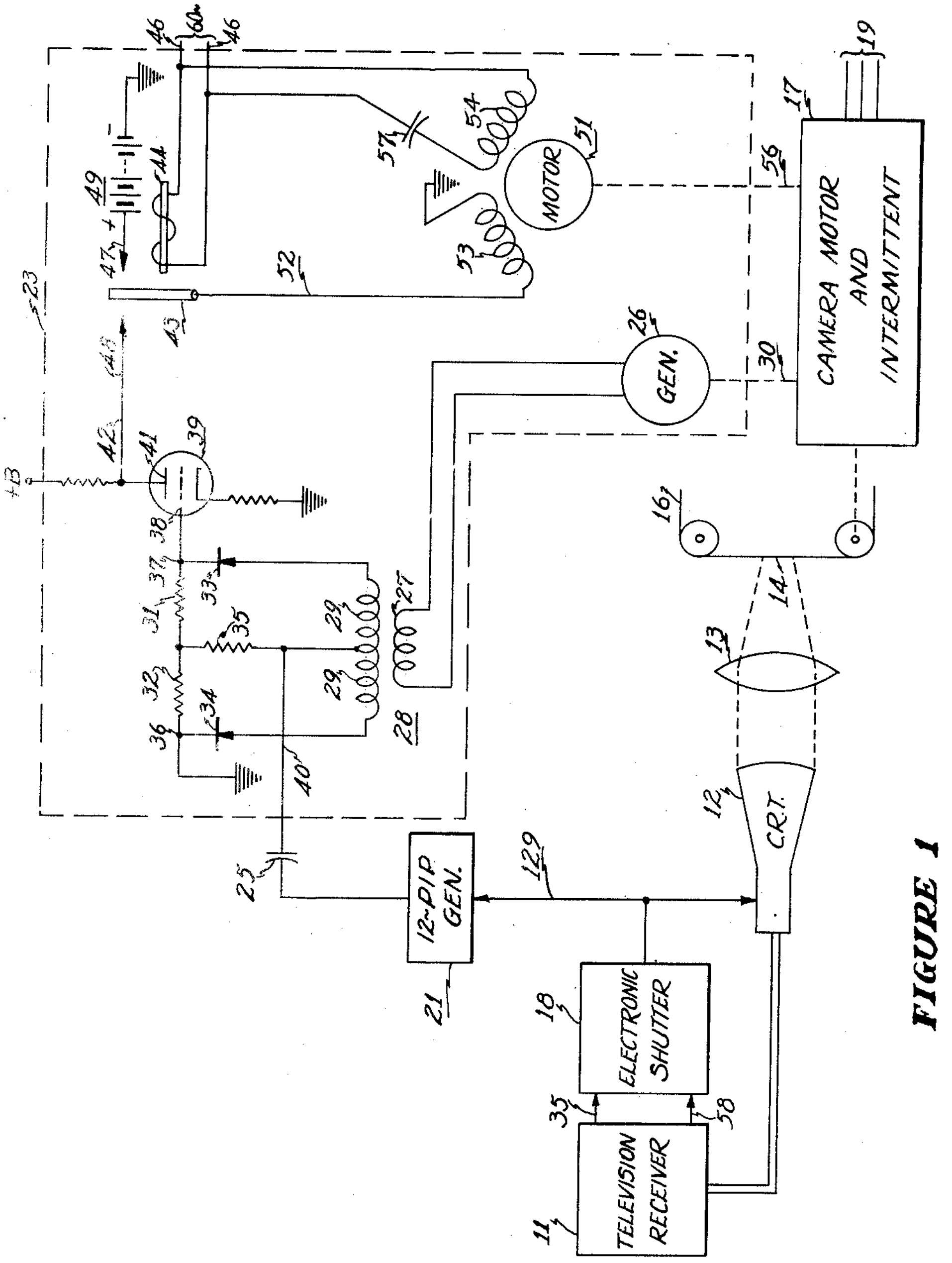
Figure 1 illustrates a method of synchronizing and phasing a television receiver shutter with a motion picture camera.

Figure 1 shows a television receiver 11 with its cathode ray tube 12, the screen of which projects a real image through an optical system represented schematically by lens 13 onto a specified area 14, occupied intermittently by successive frames of sensitized motion picture film 16. This film is contained in a motion picture camera which, including the motor and the intermittent, is represented by the rectangle 17. The shutter is not included in the camera but is separately represented by a rectangle 18 as an electronic shutter acting upon the circuits of the cathode ray tube to blank it and to permit it to be illuminated intermittently.

The camera 17 is operated from commercial mains 19 which may be 60-cycle 3-phase and may either be synchronized with those supplying the television transmitter or not. If so, comparator equipment is necessary to phase the camera; if not, the comparator equipment synchronizes as well as phases.

In order to maintain correct synchronization and phase relationships between the shutter and the intermittent, signals or orders must be transmitted between them or from an outside source to both. In the present invention signals are transmitted to the intermittent. They may be from any suitable source, but as an example the shutter is chosen as the source generating the needed signals in addition to controlling the cathode ray tube. Since these signals are to convey synchronization information to an intermittent which has a cyclic frequency of approximately 24 cps., the signal frequency maximum is inherently limited to this value. Since the shutter chosen as an example has a cyclic frequency of one fifth of the frequency of the vertical synchronizing pulses of the television receiver, or approximately 12 cycles, this frequency becomes in this example the signal frequency transmitted to the intermittent. However, any frequency equal to or less than that of the intermittent may be employed without departing from the spirit of this invention.

These phasing and synchronizing signals from the shutter 18, led through conductor 129 to pip generator 21, cause the generation of phasing pips at the cyclic rate of 12 per second. These pips are led through the blocking condenser 25 to a comparator represented as enclosed in the dashed outline 23. Also a feedback signal consisting of the rotation of the intermittent shaft is fed back through rotating shaft 30 to the comparator 23. As a result of the comparison of these two input signals, the comparator 23 generates a signal representative of the sense and amount of the difference between them, and transmits it through rotating shaft 56 to the camera in the following manner.

The feedback signals conducted into the comparator 23 through shaft 30 operate a sinusoidal generator 26 which feeds the primary winding 27 of a transformer 28 with a voltage having a frequency of approximately 12 cycles. A secondary winding 29 feeds the resistors 31 and 32 in series with the rectifiers 33 and 34, with return through the resistor 35 to a center tap, so that equal and opposite currents flow on alternate half cycles and equal and opposite potential drops are thereby generated in the resistors 31 and 32. The phasing signals are introduced through conductor 40 to the transformer midtap, and therefore if positive will add to the voltage of the terminal 36 if they occur during the half-cycle of current flow through the rectifier 34, but will add to the positive voltage of the terminal 37 if they occur during the other half-cycle, when the rectifier 33 conducts. If the pips occur at an intermediate point, the terminals 36 and 37 will be affected equally. As a result, the grid 38 of the triode 39 will be given a positive, negative or zero net direct current potential in accordance with the phase of the pip signal relative to the output phase of the generator 26, and the potential of plate 41 and conductor 42 will be varied inversely. The device thus sensitively detects and senses phase differences.

Phase differences as represented by divergences of the potential of lead 42 above and below the zero signal value are made to correct the camera motor phase and if necessary the speed as follows: A contact-making armature 43 is continuously vibrated by a solenoid 44 using any commercial supply of frequency such as 60 cycles at leads 46, so that the armature makes contact alternately with fixed contacts 47 and 48, one on each side. The contact 48 is connected to lead 42 and the contact 47 is energized by a battery 49 the potential of which is equal to the no-signal potential of lead 42. The armature 43 therefore, being alternately excited by the potentials of the fixed contacts, attains a 60-cycle potential which is of zero amount when the two fixed contact potentials are equal, and is of sensible amount otherwise, the phase when the contact 48 has the higher potential being 180° different from the phase when that contact has the lower potential. A two-phase motor 51 has one field 54 energized in series with a condenser 57 by the same source 46 that energizes the solenoid 44, the other field 53 is connected through the conductor 52 to the armature 43. Consequently the phase of the field 53 either leads or lags that of the field 54 by 90°, depending on whether contact 48 potential is above or below that of the contact 47, and the motor 51 runs clockwise or counterclockwise depending on the phase of the reference signal relative to that of the feedback signal. The motor shaft 56 is connected into the camera to correct the intermittent speed in such sense as to tend to bring the reference signal into the center phase position relative to the feedback signal.

Figure 2:
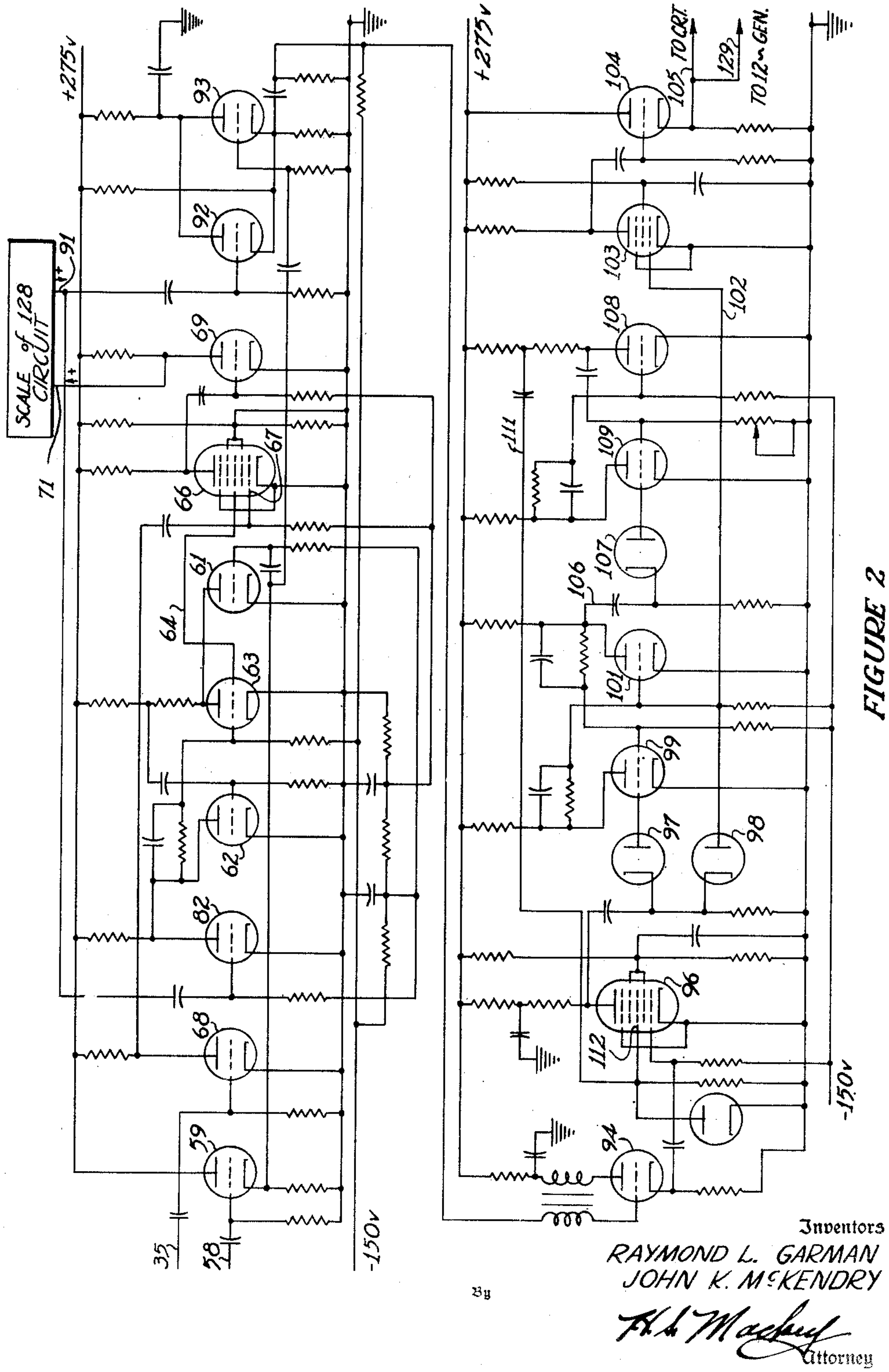
Figure 2 is a schematic diagram of the wiring of shutter switch equipment.
Figure 3:
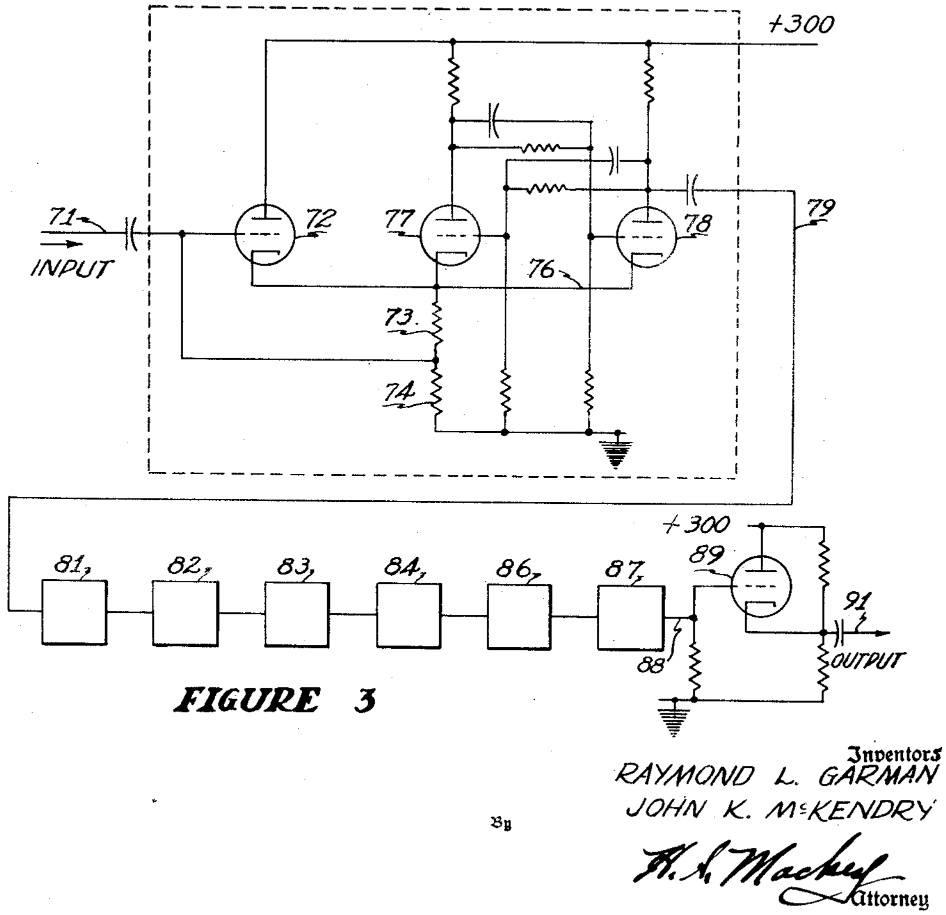
Figure 3 is a schematic wiring diagram of a scale-of-128 circuit.

The electronic shutter 18 is energized by both horizontal and vertical television synchronizing pulses secured from the television receiver 11 through conductors 35 and 58. The shutter includes switching controls, the schematic wiring of which is illustrated in Fig. 2, and a scale-of-128 circuit, with schematic wiring as illustrated in Fig. 3. These two circuits are more fully described in the copending application, Serial No. 62,832, filed on December 1, 1948 of R. W. Lee et al.; but are sufficiently described for the purpose of the instant application as follows:

In Fig. 2 a vertical pulse on conductor 58 passes through cathode follower tube 59 to trigger tube 61, operating a 110,000 μs, multivibrator consisting of tubes 62 and 63. This operation produces a positive step of potential in conductor 64 and in the screen grid of the pentagrid tube 66, the control grid 67 of which is kept negative, preventing the pentode from conducting. The next horizontal pulse, however, enters through conductor 35 and inverter tube 68, causing tube 66 to conduct momentarily and causing inverter amplifier 69 to become nonconducting, producing a positive pulse in conductor 71.

This pulse energizes a scale-of-128 circuit illustrated in Fig. 3, consisting of seven similar scale-of-two circuits in tandem. The above-mentioned positive pulse energizes the scale-of-128 circuit through conductor 71 and trigger tube 72, loading the cathode resistors 73 and 74 and making the cathode conductor 76 positive. Assuming tube 77 initially conducting, it is made nonconducting and the plate current flow of tube 78 is started, producing a negative pulse in conductor 79. However, the trigger tubes of all stages being normally nonconducting, they are insensitive to negative pulses, hence the negative pulse on conductor 79 does not affect the succeeding stage 81. However, the next horizontal pulse entering through conductor 71 produces a positive pulse in conductor 79, so that the number of entering pulses is halved at the output lead. Likewise each following stage 81, 82, 83, 84, 86 and 87 divides its input pulse frequency by two, so that for every 128 pulses entering on conductor 71, one positive pulse is emitted on conductor 88, and being positive causes current flow in the cathode follower tube 89 and a consequent positive output pulse in conductor 91 which reenters the switching circuit of Fig. 2.

Such positive 128th pulses are mixed with successive vertical pulses in mixer tubes 92 and 93, and the mixed series causes sharp positive and negative pulses to be emitted by blocking oscillator tube 94. The positive peak momentarily makes switch tube 96 conducting, assuming its third grid to be positive, impressing negative pulses on diodes 97 and 98 serving as entrance valves to a scale-of-two circuit consisting of the triodes 99 and 101. Their output therefore consists of two levels of potential under control of successive pulses from switch tube 96, and these levels or steps of potential are transmitted through conductor 102, amplifier 103, cathode follower 104 and conductor 105 to the cathode of the television receiver cathode ray tube. A positive step of potential thus transmitted blanks the tube, and a negtive step permits illumination.

Pulses from the scale-of-two tubes 99 and 101 additionally, through conductor 106 and clipper tube 107, operate the single-stroke multivibrator composed of tubes 108 and 109, which has a natural period of 28,000 microseconds. The outer steps of potential of this multivibrator through conductor 111 control the potential of third grid 112 of switch tube 96 with the effect that the tube is disabled or made nonconducting during three of the series of mixed vertical and scale-of-128 pulses arriving at its control grid, then permitted to conduct two, repeating this cycle. This permits the cathode ray tube 12 in Fig. 1 to be illuminated for four of the mixed series pulse periods, the exact length of time duration of one video picture, then to be blanked for the length of time of one period, corresponding to either 128 horizontal lines or scan periods or to the time of one field (½ video picture time) minus 128 lines, these alternative times being employed alternately.

The output steps of potential of the shutter also are transmitted through conductor 129, to the pip generating circuit 21 (Fig. 1).

Figure 4:
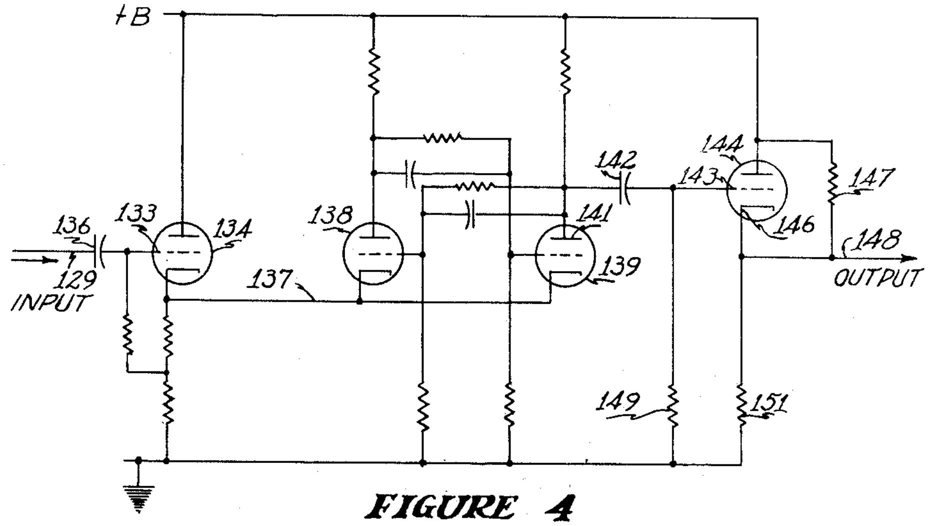
Figure 4 is a schematic wiring diagram of a 12-cycle pip generator.

This pip generating circuit is illustrated in Fig. 4. Incoming positive pulses transmitted through differentiating condenser 136 and cathode follower 134 energizes a scale-of-two circuit consisting of tubes 138 and 139, and half-frequency pulses are differentiated in condenser 142, clipped in tube 144, and passed out conductor 148 as positive pulses to the comparator, Fig. 1. These pulses have a cyclic frequency of 12, being one-half of the frequency of the input pulses at conductor 129 from the output terminal of the shutter.

Figures 5, 6:
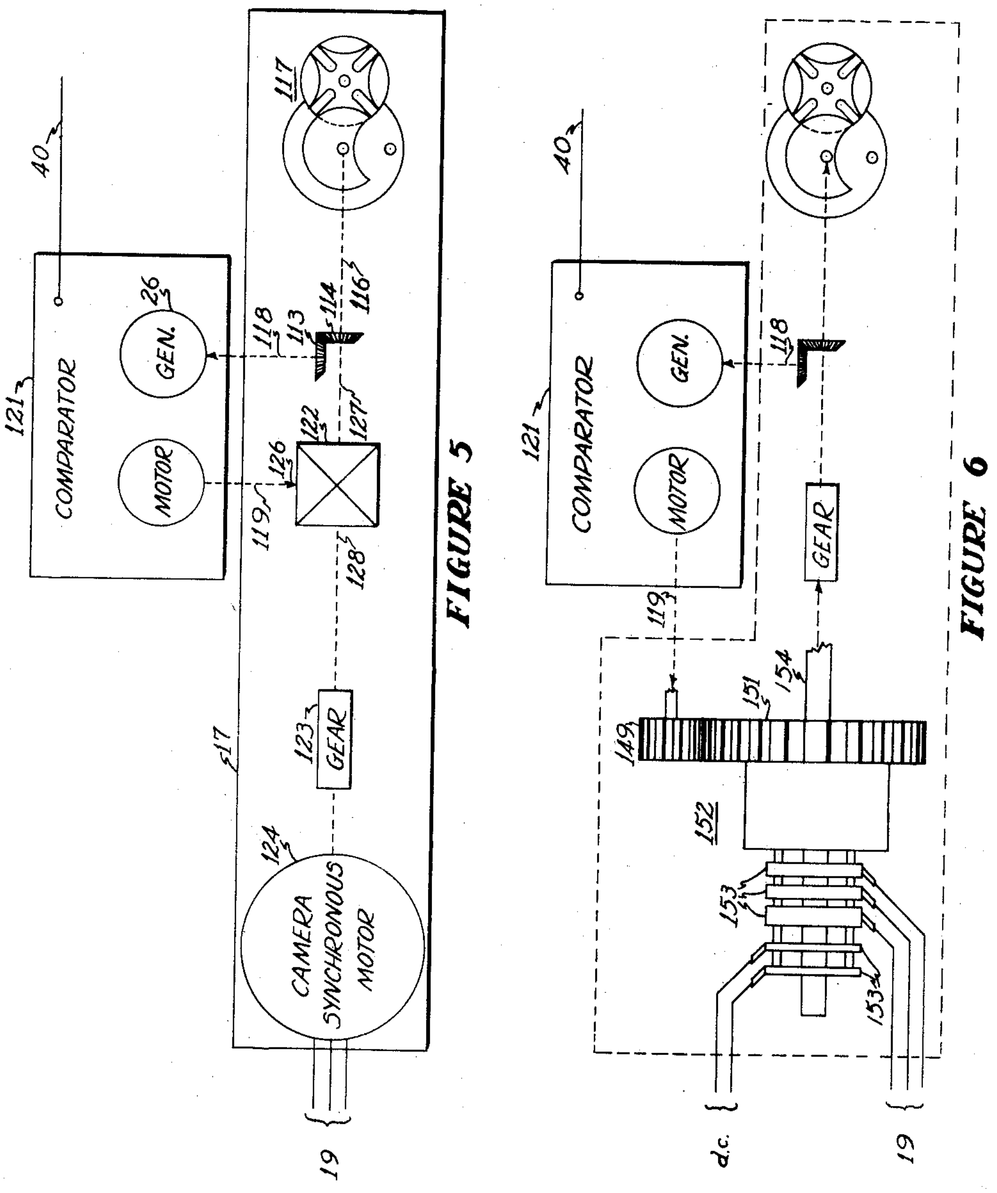
Figure 5 illustrates the introduction of a difference correction through a mechanical differential.
Figure 6 illustrates the introduction of a difference correction by a rotatable stator.

Fig. 5 illustrates one method of introduction of a correction signal to the intermittent by means of a mechanical differential for the purpose of phasing and synchronizing the intermittent with a reference signal. A comparator 121, which may be of any type having mechanical feedback and automatically furnishing a mechanical phase correction signal, such as for example, comparator 23 of Fig. 1, receives through conductor 40 synchronizing and phasing electrical reference signals from any source referred in the final analysis to shutter operation, such as from the pip generator 21 and shutter 18 of Fig. 1, and receives mechanical shaft rotation feedback signals through the shaft 118 and the bevel gears 113 and 114 from the intermittent shaft 116 driving the intermittent 117. The intermittent shaft 116 is driven through a mechanical differential 122 and a speed changing gear 123 by the camera synchronous motor 124, which is powered through leads 19 by commercial power which may be 60-cycle, 3-phase and need not be synchronized with the television transmitter or shutter. The third shaft 126 of the differential 122 is actuated by the motor shaft 119 of comparator 121, through which there is furnished a correction displacement and if required a correction speed.

Mechanical differentials being addition and subtraction devices, the output displacement or speed of differential 122 at its shaft 127 will be derived from the algebraic sum of the input displacements or speeds at its input shafts 126 and 128. For example, assuming that the differential is of the spur gear type and that the shaft 126 is the spider or case shaft, $D_o=2D_s-D_i$ where $D_o$ is the displacement or speed of output shaft 127, $D_s$ is that of input spider shaft 126 and $D_i$ is that of input shaft 128. Other arrangements of the spider shaft may be used or other types of differential may be employed with appropriate changes in speed reduction gear ratios and of directions of rotation.

Operation of the mechanism is as follows: Let it be supposed that the motor 124 operates at high speed so that the intermittent 117 operates faster than the speed which would synchronize the pulldown operation with the shutter operation as represented by the signal received through conductor 40. Generator 26 then operates at above-normal speed resulting in comparator operation as previously described rotating shaft 119. This introduces a speed of rotation at shaft 125, which the differential subtracts from the speed of rotation of shaft 128, transmitting the difference represented by the speed of shaft 127 to the intermittent and through shaft 118 to the generator 26. The latter thus having a speed reduced to or toward normal, reduces the correction signal at shaft 126 to or toward zero, so that the speed of the intermittent 117 becomes or tends to become normal, ultimately resulting in a speed approaching or hunting about normal to a closeness dependent on the effective amplification and damping of the comparator 121 and its feedback loop.

Figure 6 illustrates another embodiment of the invention wherein the field of the synchronous motor driving the intermittent movement may be mechanically rotated in accordance with a reference signal so that the intermittent is properly synchronized and phased as respects the project television image. A comparator 121 as described in connection with Fig. 5 is actuated by a reference signal through conductor 40 and by the feedback shaft 118. Its output correction signal is transmitted as a displacement or speed of its shaft 119 to a pinion 149. This pinion is meshed with a gear 151 fastened to the stator structure of the camera synchronous motor 152. The five slip rings 153 mechanically fixed to the rotatable stator structure of the motor are required to conduct current to the field and armature circuits and are in addition to the standard internal rings of a synchronous motor (not shown). Any rotation of the stator of this motor must therefore rotate the field flux mechanically, and this rotation will obviously result in an increased speed or displacement of rotation of the motor output shaft 154 if the direction of rotation of the flux is the same as that of shaft 154, or will result in a decreased speed or displacement of rotation of the motor output shaft 154 if the direction of rotation of the flux is opposite to that of shaft 154. A differential control of the speed or displacement of the intermittent by the comparator in accordance with the synchronizing and phasing signal through rotation of the motor field flux, the motor operating as an electromagnetic differential gear, is thus effected with a final result as described in connection with Fig. 5.

Figure 7:
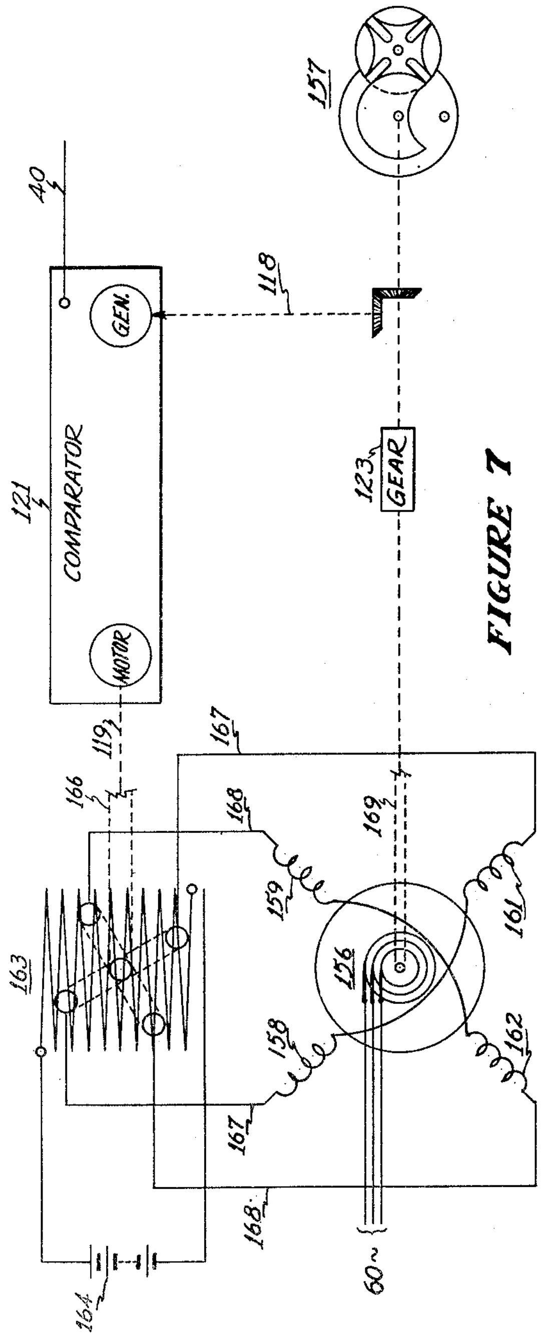
Figure 7 illustrates the introduction of a difference correction by rotation of the camera motor field flux through use of a sine potentiometer.

Rotation of the field flux without mechanical rotation of the field structure to introduce the correction signal to the intermittent rotation is shown in Fig. 7, employing a potentiometer. A synchronous camera motor 156 drives an intermittent 157 through a gear 123, a feedback signal at shaft 118 being compared with the reference signal received through conductor 40 by a comparator 121 and a correction signal being produced thereby as a rotation of shaft 119, all as described in connection with Fig. 5. The motor 156, however, has field windings 158, 159, 161 and 162 in spatially two-phase arrangement brought out to the four output terminals of a sine-cosine potentiometer 163 excited by a battery 164. The potentiometer shaft 166 is attached directly or through step-down gearing to the comparator output shaft 119, so that correction displacements or speeds of the shaft 119 will produce in pairs of leads 167 and 168 potentials which will vary according to the sine and cosine, respectively, of the rotation of shaft 119. These potentials applied to windings 158, 159, 161 and 162 produce a rotating field flux in the motor 156 which is representative in sense, angular displacement and speed of that of the rotation of the shaft 119. This field displacement or speed will add to or subtract from the displacement or speed of motor shaft 169, and this addition or subtraction is arranged to be in such sense as to tend to bring the feedback signal frequency to an equality with the frequency of the reference signal, resulting in a synchronized and phased rotation of the intermittent.

Figure 8:
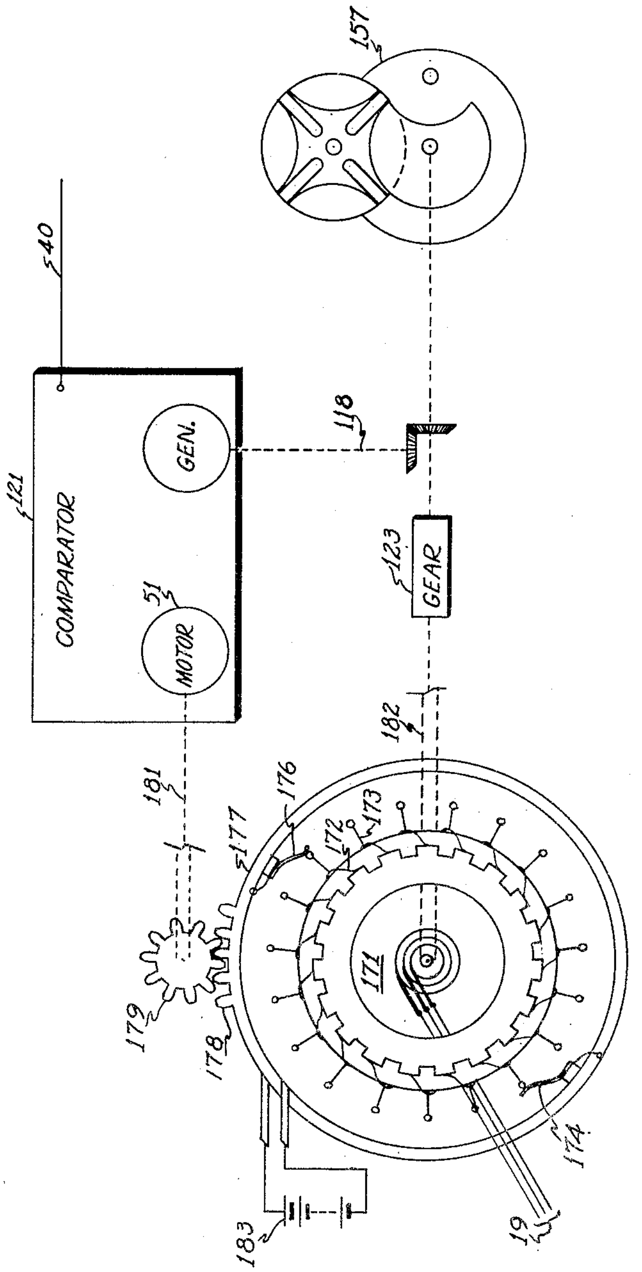
Figure 8 illustrates the introduction of a difference correction by rotation of the camera motor field flux with a tap switch.

A variation of this method of electrical rotation of the synchronous motor field flux is illustrated in Fig. 8, employing a multipoint switch. A synchronous motor 171 drives the camera intermittent 157 through the gear 123, and the speed and displacement of the feedback shaft 118 are compared by a comparator 121 with those of the reference signal entering on conductor 40 as before described. However, the motor field 172 is connected by numerous progressively positioned taps such as the tap 173 with the terminals of a switch having two contact arms, 174 and 176. This switch is shown functionally as surrounding the motor and with the two contact arms as carried by a ring 177 having teeth 178 around its periphery, a part only of which is here illustrated. A pinion 179 meshes with the teeth 178 and the pinion 179 is driven through a shaft 181 by the motor 51 of the comparator 121. Rotation of the motor-shaft 182 rotates the intermittent 157 and the feedback shaft 118. The comparator 121 compares the speed and displacement of the shaft 118 with the speed and displacement associated with the reference signal and through the output motor 51 produces as a correction signal a displacement or speed of the shaft 181 and the pinion 179. This rotates the switch yoke 177 so that a field excitation source diagrammatically illustrated by the battery 183 is connected through the brushes 174 and 176 to two opposite terminals of the field 172, the points of connection moving progressively around the motor magnetic structure in accordance with the rotation of the pinion 179. As these points of introduction of field excitation rotate, the magnetic field poles are likewise rotated, and if the motion is in the same direction as the rotor rotation the latter will be increased in amount to the sum of the two, or if the motion is in the opposite direction, the output shaft rotation will be the difference of the two.

Figure 9:
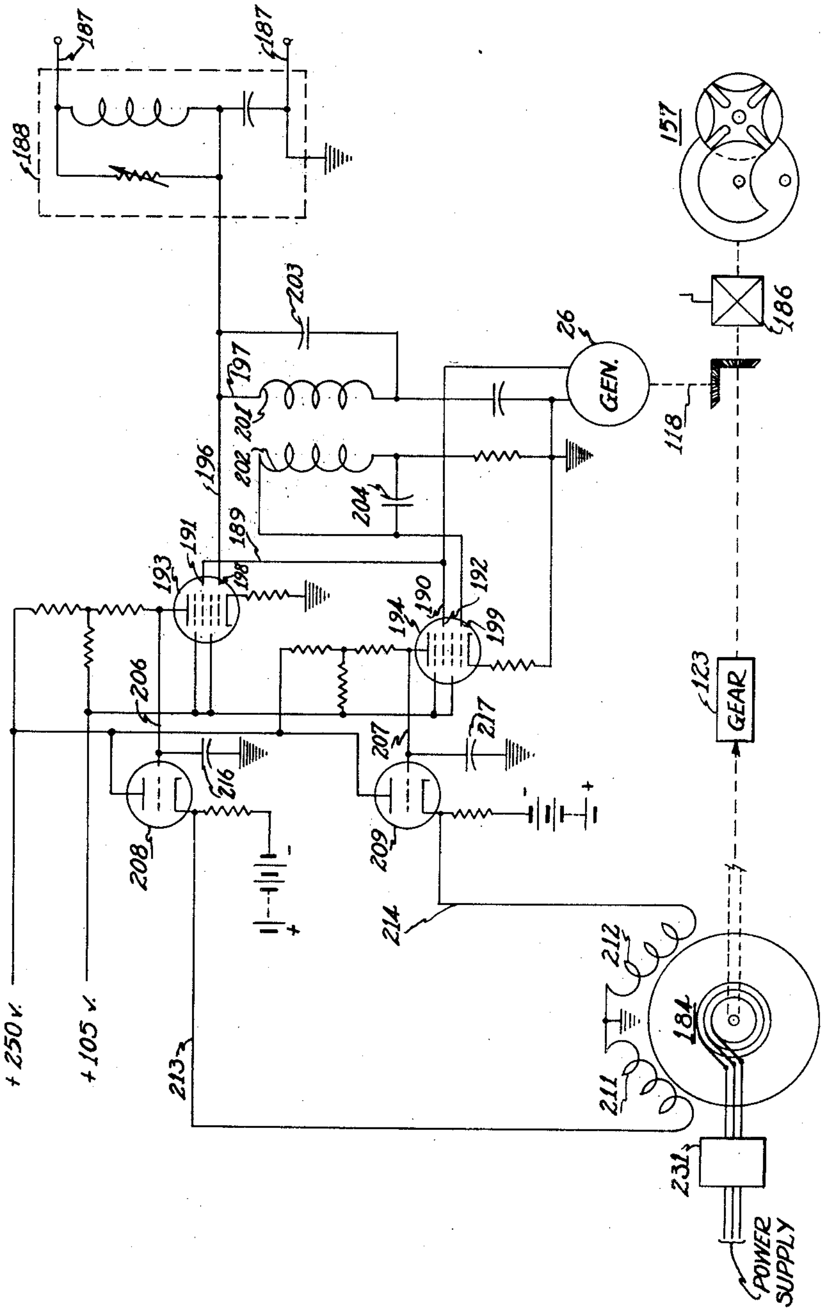
Figure 9 illustrates the introduction of a difference correction by rotation of the camera motor field flux with an electronic converter.

Another variation employing rotation of the synchronous motor field flux is shown in Fig. 9. A different type of comparator is employed as illustration because the correction signal is required to be in a specific electrical form, and any comparator producing a correction signal of this required form may be employed. The comparator of Fig. 9 employs a converter such as described in copending application, Serial No. 29,393, filed on May 26, 1948, now Patent No. 2,561,182, of Robert Crane, Jr. As before, a camera synchronous motor 184 drives an intermittent 157 through reduction gear 123. A feedback shaft 118 drives a generator 26 the output frequency of which, representative of the speed and displacement of the intermittent, is to be compared with the frequency and phase of a reference signal introduced at conductors 187. To facilitate initial adjustment of phase, provision for shifting the phase of either the intermittent cycle or the reference signal with respect to the other may be made. For example, a mechanical differential 186 may be inserted between the take-off point of the feedback shaft 118 and the intermittent 157, or a phase-shifting network 188 may be inserted between the reference signal input conductors 187 and the converter.

The feedback signal is fed through conductors 189 and 190 to grids 191 and 192 of tetragrid converter tubes 193 and 194. The reference signal is fed through conductors 196 and 197 to grids 198 and 199 of the same tubes, but in conductor 197 there is inserted a network which produces a 90° phase lag. This network may be of any type but preferably consists of two coils 201 and 202 having mutual inductance and tuned by two condensers 203 and 204 to the reference frequency. The tubes 193 and 194 mix the signals and produce at conductors 206 and 207 output voltages of sum and difference frequencies, with the phase of the voltage in conductor 207 leading or lagging that of conductor 206 by 90°, depending on which of the two input voltages is of higher frequency. The voltages on conductors 206 and 207 are applied to the grids of cathode follower tubes 208 and 209 and the transformed outputs are applied to field windings 211 and 212 of the motor 184. These windings are mechanically arranged to be magnetically 90° apart, so that when excited by slowly alternating electrical power through conductors 213 and 214, with one leading the other by 90° in phase, a continuous field flux rotation will be produced with the direction of rotation dependent on which field voltage lags. Condensers 216 and 217 cooperate with the field inductances to pass the difference frequency to the fields and to drain off the sum frequency through the condensers to ground. The cathode returns and cathode resistors of tubes 208 and 209 are arranged so that potentials of conductors 213 and 214 will be varied by equal amounts above and below ground. The combination of field flux motion with normal synchronous motor rotation of the rotor will produce modified rotation of the intermittent as described in connection with Fig. 5.

In feedback amplifier arrangements a residual error usually exists. This may be minimized in the present case by eliminating the reduction gearing 123, interposing a frequency converter 231 between the 60-cycle power supply and the synchronous motor thus reducing the frequency of the latter to approximately that of the intermittent, and of course employing a motor 184 built for that frequency.

Figure 10:
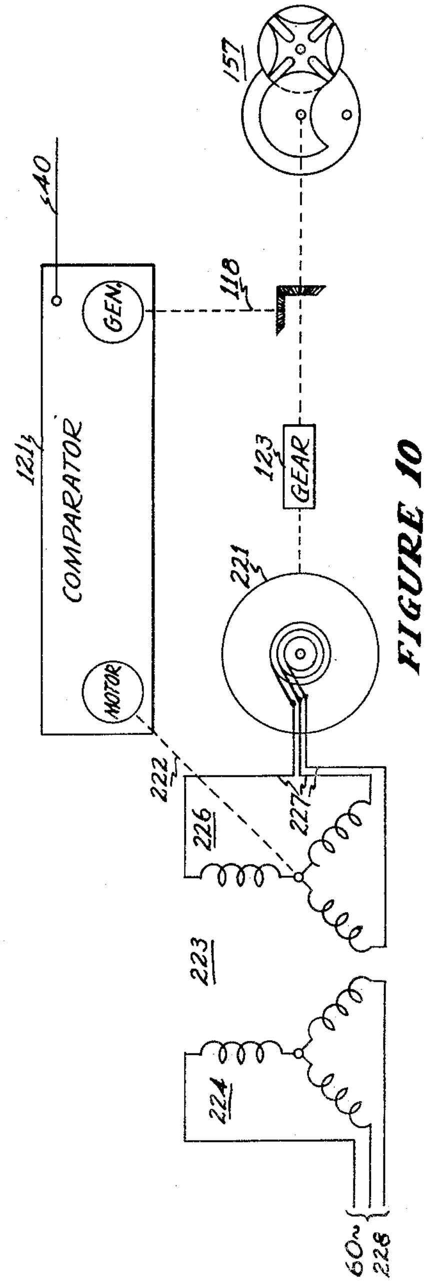
Figure 10 illustrates the introduction of a difference correction by rotation of the phase of the electric power supplying the camera motor.

A third embodiment of the invention is shown in Fig. 10 in which the synchronizing and phasing correction difference signal is introduced between the unsynchronized power supply and the synchronous camera motor. The motor 221 drives an intermittent 157 through a gear 123, and a feedback shaft 118 enters a comparator 121, which may be as described in connection with Fig. 5. The comparator compares the feedback signal with a reference signal entering through a conductor 40 and produces a correction signal consisting of the rotation of a shaft 222. This shaft drives the shaft of a differential self-synchronous device. Such a device contains two sets of windings spatially arranged as if for polyphase operation. As an illustration it is preferred to employ a three-phase stator 224 excited by three-phase supply conductors 228, and a three-phase rotor 226. The phase of the output conductors 227 will then be progressively changed with respect to the phase of the input conductors connected to power mains by rotation of rotor 226 through shaft 222, and this phase-changing, if continuous, of course amounts to a change of frequency. The phase and frequency changes thus produced by the correction signal introduced through shaft 222 are made to be of such sense as to tend to bring the frequency and phase of the feedback signal in shaft 118 and of the cyclic operation of the intermittent 157 to be the same as those of the reference signal, as described in connection with Fig. 5.

What is claimed is:

1. A synchronizing and phasing system for a television recorder comprising, a television receiver including a cathode ray tube for the display of the received television images on the screen thereof, electronic shutter means actuated by the received television synchronizing signals for periodically blanking said cathode ray tube screen, a motion picture camera including an intermittent actuating a sensitized film strip, means for projecting the images formed by the illumination of said cathode ray tube screen on said film strip, means operated by said intermittent for producing a first signal, means operated in accordance with actuation of said shutter means producing a second signal, comparison means operated by said first and second signals having as an output an error signal whose amplitude and sense is a function of the departure in phase relation between the blanking of said cathode ray tube screen and the operation of said intermittent and means for altering the speed and angular displacement of said intermittent in accordance with the amplitude and sense of said error signal.

2. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent including a driving means for periodically advancing said sensitized film strip, means operated by signals derived from said electronic shutter for producing a first signal whose phase corresponds to the periodic blanking of said cathode ray tube screen, means operated by said intermittent for producing a second signal whose phase corresponds to the periodic advancement of said film strip, means for comparing the phase of said first and second signals and for producing an error signal from said comparison whose amplitude and sense is a function of the difference in phase between said first and second signals, and means for altering the operation of said driving means in accordance with the amplitude and sense of said error signal.

3. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent including a driving means for periodically advancing said sensitized film strip, a first signal generator operated by signals derived from said electronic shutter generating a first signal bearing a definite phase relation to said periodically receiving blanking periods, a second signal generator operated by said intermittent driving means generating a second signal bearing a definite phase relation to the periodic operation of said intermittent, comparison means connected to compare the phase relation between said first and second signals and for producing an error signal which varies in accordance with the relative phase relation of said first and second signals, and means for altering the operation of said intermittent driving means in accordance with said error signal.

4. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent including a driving means for periodically advancing said sensitized film strip, a first signal generator operated by signals derived from said electronic shutter generating a first signal bearing a definite phase relation to the periodically recurring blanking periods, a second signal generator operated by said intermittent driving means generating a second signal bearing a definite phase relation to the periodic operation of said intermittent, a phase detection circuit connected to compare the phase relation between said first and second signals and for producing an error signal having an amplitude and sense dependent on the phase relation between said first and second signals, a motor operated by said error signal, and means operated by said motor for altering the operation of said intermittent driving means in accordance with the operation of said motor.

5. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent for periodically advancing said sensitized film strip, a motor driving said intermittent, a first signal generator operated by signals derived from said electronic shutter generating a first signal bearing a definite phase relation to the periodic blanking periods, a second signal generator operated by said intermittent driving motor generating a second signal bearing a definite phase relation to the periodic operation of said intermittent, a phase detection circuit connected to compare the phase relation between said first and second signals producing an error signal whose quality is dependent on the phase relation between the first and second signals and means operated by said error signal for rotating the field flux of said intermittent driving motor whereby said intermittent is maintained in phase and synchronism with said blanking periods.

6. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent for periodically advancing said sensitized film strip, a motor driving said intermittent, a first signal generator operated by signals derived from said electronic shutter generating a first signal bearing a definite phase relation to the periodic blanking periods, a second signal generator operated by said intermittent driving motor generating a second signal bearing a definite phase relation to the periodic operation of said intermittent, a phase detection circuit connected to compare the phase relation between said first and second signals producing an error signal having a sense and amplitude dependent on the phase relation between the first and second signals, a motor operated in one direction or another dependent on the sense of said error signal and means controlled by said motor for rotating the field flux of said intermittent driving motor.

7. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent for periodically advancing said sensitized film strip, a motor, driving means connected between said motor and said intermittent, a first signal generator operated by said electronic shutter generating a first signal bearing a definite phase relation to the periodically recurring blanking periods, a second signal generator connected to said intermittent and operated thereby to generate a second signal bearing a definite phase relation to the periodic operation of said intermittent, means for comparing the relative phase relation of said first and second signals and means operated by said last named means for maintaining a said intermittent in synchronism and constant phase relation with said blanking periods.

8. A synchronizing and phasing system for a television recorder wherein television images formed on a cathode ray tube screen are succesively projected on a sensitized film strip comprising, an electronic shutter operated by the received television synchronizing signals for periodically blanking said cathode ray tube screen, an intermittent for periodically advancing said sensitized film strip, a motor, driving means connected between said motor and said intermittent, a first signal generator operated by said electronic shutter generating a first signal bearing a definite phase relation to the periodically recurring blanking periods, a second signal generator connected to said second intermittent and operated thereby to generate a second signal bearing a definite phase relation to the operation of said intermittent, a phase detection circuit connected to compare the phase relation between said first and second signals and producing an error signal having an amplitude and sense dependent on the relation between said first and second signals, a motor operated by said error signal and means interposed in said intermittent driving means between said first mentioned motor and said intermittent for altering the operation of said intermittent in accordance with the operation of said second mentioned motor.

9. A synchronizing and phasing system according to claim 8 in which said means interposed in said intermittent driving means comprises a differential having a first input shaft operated by said first mentioned motor, a second input shaft operated by said second mentioned motor and an output shaft connected to operate said intermittent.

10. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent, a synchronous motor connected to operate said intermittent, a source of alternating current supply for said synchronous motor, a first signal generator operated by said electronic shutter generating a first signal bearing a definite phase relation to the periodically recurring blanking periods, a second signal generator operated by said intermittent generating a second signal bearing a definite phase relation to the periodic operation of said intermittent, means for comparing the relative phase relation of said first and second signals and means operated by said last named means for varying the phase of the alternating current supply for said synchronous motor whereby the intermittent driven by said synchronous motor is maintained in synchronism and constant phase relation with said blanking periods.

11. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent, a synchronous motor connected to operate said intermittent, a source of alternating current supply for said synchronous motor, a first signal generator operated by said electronic shutter generating a first signal bearing a definite phase relation to the periodically recurring blanking periods, a second signal generator operated by said intermittent generating a second signal bearing a definite phase relation to the periodic operation of said intermittent, a phase detection circuit having impressed thereon said first and second signals producing an error signal whose sense is dependent on the relative phase relation of said first and second signals and means operative by said error signal for varying the phase of the alternating current supply for said synchronous motor whereby the intermittent driven by said synchronous motor is maintained in synchronism and constant phase relation with said blanking periods.

12. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent, a synchronous motor connected to operate said intermittent, a source of alternating current supply for said synchronous motor, a first signal generator operated by said electronic shutter generating a first signal bearing a definite phase relation to the periodically recurring blanking periods, a second signal generator operated by said intermittent generating a second signal bearing a definite phase relation to the periodic operation of said intermittent, a phase detection circuit having impressed thereon said first and second signals producing an error signal whose sense is dependent on the relative phase relation of said first and second signals, a motor operated in one direction or another in response to the sense of said error signal and phase shifting means operated by said last mentioned motor connected in circuit between said alternating current supply source and said synchronous motor whereby the intermittent driven thereby is maintained in synchronism and constant phase relation with said blanking periods.

13. A synchronizing and phasing system for a television recorder wherein television images formed on a cathode ray tube screen are successively projected on a sensitized film strip comprising, an electronic shutter operated by the received television synchronizing signals for periodically blanking said cathode ray tube screen, an intermittent, a synchronous motor driving said intermittent, a first signal generator operated in accordance with the received television synchronizing signal generating a first signal bearing a definite phase relation to the periodically recurring blanking periods, a second signal generator operated by said intermittent generating a second signal bearing a definite phase relation to the periodic operation of said intermittent, means for comparing the relative phase relation of said first and second signals and means operative by said last named means for rotating the field flux of said synchronous motor whereby the intermittent driven thereby is maintained in synchronism and constant phase relation with said blanking periods.

14. In a television recorder system wherein television images formed on a cathode ray tube screen are successively projected on an intermittently actuated film strip, the method of operation which comprises, generating blanking signals from the received television synchronizing signals and utilizing said signals to periodically blank the cathode ray tube screen, generating a first signal bearing a definite phase relation to said blanking periods generating a second signal bearing a definite phase relation to the intermittent actuation of said film strip, comparing the phase relation of said first and second signals and utilizing said comparison to alter the periods of intermittent actuation of said film strip to maintain synchronism between the movement of said film strip and said blanking periods.

15. In a television recorder system wherein television images formed on a cathode ray tube screen are successively projected on an intermittently actuated film strip, the method of operation which comprises, generating blanking signals from the received television synchronizing signals and utilizing said blanking signals to periodically blank the cathode ray tube screen, utilizing said received television synchronizing signals to generate a first signal bearing a definite phase relation to said blanking periods, generating a second signal from the actuation of said film strip bearing a definite phase relation to the intermittent actuation thereof, comparing the phase of said first and second signals, producing an error signal from said comparison and utilizing said error signal to correct for departure from synchronism between said blanking signals and the intermittent actuation of said film strip.

16. The method of photographing a television picture on an intermittently advanced film strip which comprises, periodically and recurrently shuttering the television picture, producing a signal representative of the speed and phase of the recurrent shuttering periods, producing a signal representative of the speed and phase of actuation of the intermittent mechanism, comparing said first and second mentioned signals, producing a correction signal as a result of such comparison and correcting the speed of the intermittent by said comparison signal.

RAYMOND L. GARMAN.
JOHN K. McKENDRY.

REFERENCES CITED

The following references are of record in the file of this patent:

UNITED STATES PATENTS

| Number | Name | Date |
|---|---|---|
| 1,832,309 | Knoop | Nov. 17, 1931 |
| 2,212,447 | Mathes | Aug. 20, 1940 |
| 2,251,786 | Epstein | Aug. 5, 1941 |
| 2,371,905 | Mathes | Mar. 20, 1945 |
| 2,373,114 | Goldsmith, Jr. | Apr. 10, 1945 |
| 2,404,839 | Hammond | July 30, 1946 |
| 2,455,323 | Townsend | Nov. 30, 1948 |
| 2,486,717 | Maurer et al. | Nov. 1, 1949 |

FOREIGN PATENTS

| Number | Country | Date |
|---|---|---|
| 439,994 | Great Britain | Dec. 18, 1935 |
| 883,910 | France | July 26, 1943 |